United States Patent
Lin et al.

(10) Patent No.: US 11,115,653 B2
(45) Date of Patent: Sep. 7, 2021

(54) INTRA BLOCK COPY MERGE LIST SIMPLIFICATION

(71) Applicant: MediaTek Inc., Hsinchu (TW)

(72) Inventors: Yu-Cheng Lin, Hsinchu (TW); Chun-Chia Chen, Hsinchu (TW); Chih-Wei Hsu, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 0 days.

(21) Appl. No.: 16/795,491

(22) Filed: Feb. 19, 2020

(65) Prior Publication Data

US 2020/0275093 A1 Aug. 27, 2020

Related U.S. Application Data

(60) Provisional application No. 62/808,940, filed on Feb. 22, 2019.

(51) Int. Cl.
  *H04N 19/00* (2014.01)
  *H04N 19/105* (2014.01)
  *H04N 19/176* (2014.01)
  *H04N 19/159* (2014.01)
  *H04N 19/137* (2014.01)
  *H04N 19/52* (2014.01)

(52) U.S. Cl.
  CPC ......... *H04N 19/105* (2014.11); *H04N 19/137* (2014.11); *H04N 19/159* (2014.11); *H04N 19/176* (2014.11); *H04N 19/52* (2014.11)

(58) Field of Classification Search
  CPC ...................................................... H04N 19/00
  See application file for complete search history.

(56) References Cited

U.S. PATENT DOCUMENTS

2017/0054996 A1* 2/2017 Xu ........................ H04N 19/593
2020/0112741 A1* 4/2020 Han ..................... H04N 19/423

FOREIGN PATENT DOCUMENTS

CN 106797466 A 5/2017
CN 108141605 A 6/2018

OTHER PUBLICATIONS

China National Intellectual Property Administration, International Search Report and Written Opinion for PCT/CN2020/076174, dated May 12, 2020.

(Continued)

*Primary Examiner* — Maryam A Nasri
(74) *Attorney, Agent, or Firm* — Oblon, McClelland, Maier & Neustadt, L.L.P.

(57) ABSTRACT

A method for generating a list of merge candidates for Intra Block Copy (IBC) prediction is provided. A video codec receives data to be encoded or decoded as a current block of a current picture of a video. A plurality of spatially adjacent neighboring blocks of the current block are coded before the current block. The video codec generates a list of merge candidates including intra picture candidates that are associated with motion information referencing pixels in the current picture. The intra picture candidates comprises candidates that are associated with some but not all of the two or more spatially adjacent neighboring blocks of the current block. The video codec selects a merge candidate from the generated list. The video codec encodes or decodes the current block by using the motion information of the selected merge candidate to generate a prediction of the current block.

16 Claims, 8 Drawing Sheets

| Merge_index | L0 | L1 |
|---|---|---|
| 0 | mvL0_A, ref0 | - |
| 1 | - | mvL1_B, ref0 |
| 2 | | |
| 3 | | |
| 4 | | |

→

| Merge_index | L0 | L1 |
|---|---|---|
| 0 | mvL0_A, ref0 | - |
| 1 | - | mvL1_B, ref0 |
| 2 | mvL0_A, ref0 | mvL1_B, ref0 |
| 3 | | |
| 4 | | |

(56) References Cited

OTHER PUBLICATIONS

Zhang, Li et al, CE4-related: History-based Motion Vector Prediction Joint Video Experts Team (JVET) of ITU-T SG 16 WP 3 and ISO/IEC JTC 1/SC 29/WG 11, Jul. 18, 2018, pp. 3 and 4.

* cited by examiner

INTRA BLOCK COPY MERGE LIST SIMPLIFICATION

CROSS REFERENCE TO RELATED PATENT APPLICATION(S)

The present disclosure is part of a non-provisional application that claims the priority benefit of U.S. Provisional Patent Application No. 62/808,940, filed on 22 Feb. 2019. Contents of above-listed applications are herein incorporated by reference.

TECHNICAL FIELD

The present disclosure relates generally to video processing. In particular, the present disclosure relates to methods of generating a list of merge candidates for Intra Block Copy (IBC) prediction.

BACKGROUND

Unless otherwise indicated herein, approaches described in this section are not prior art to the claims listed below and are not admitted as prior art by inclusion in this section.

High-Efficiency Video Coding (HEVC) is an international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block of pixels, and each CU can be recursively split into four smaller CUs until the predefined minimum size is reached. Each CU contains one or multiple prediction units (PUs).

To achieve the best coding efficiency of hybrid coding architecture in HEVC, there are two kinds of prediction modes for each PU, which are intra prediction and inter prediction. For intra prediction modes, the spatial neighboring reconstructed pixels can be used to generate the directional predictions. There are up to 35 directions in HEVC. For inter prediction modes, the temporal reconstructed reference frames can be used to generate motion compensated predictions. There are three different modes, including Skip, Merge and Inter Advanced Motion Vector Prediction (AMVP) modes.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the disclosure provide a method for generating a list of merge candidates for Intra Block Copy (IBC) prediction. A video codec receives data to be encoded or decoded as a current block of a current picture of a video. Two or more spatially adjacent neighboring blocks of the current block are coded before the current block. The video codec generates a list of merge candidates including intra picture candidates that are associated with motion information referencing pixels in the current picture. The intra picture candidates comprises candidates that are associated with some but not all of the two or more spatially adjacent neighboring blocks of the current block. The video codec selects a merge candidate from the generated list. The video codec encodes or decodes the current block by using the motion information of the selected merge candidate to generate a prediction of the current block.

The spatially adjacent neighboring blocks of the current block may be to the left and to the top of the current block, and some of the spatially adjacent neighboring blocks are excluded from the generated list of merge candidates. The intra picture candidates may include candidates that are associated with one spatially adjacent neighboring block above the current block and one spatially adjacent neighboring block to the left of the current block and no other spatially adjacent neighboring block of the current block.

In some embodiments, the video codec generates the list of merge candidates by performing a simplified pruning process. In some embodiments, the video codec maintains several history-based motion vector prediction (HMVP) candidates for a current slice that includes the current block, each HMVP candidate associated with motion information of a previously coded block. At least one HMVP candidate from the plurality of HMVPs is compared with the list of merge candidates for (detecting) redundancy. In some embodiments, the simplified pruning process may not perform on HMVP candidates. In some embodiments, the video codec generates the list of merge candidates comprises determining which merge candidate to include in the list based on a property of the current block.

BRIEF DESCRIPTION OF THE DRAWINGS

The accompanying drawings are included to provide a further understanding of the present disclosure and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

DETAILED DESCRIPTION

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

I. Candidate List a. Merge Mode and AMVP

For intra prediction modes, the spatial neighboring reconstructed pixels can be used to generate the directional predictions. For inter prediction modes, the temporal reconstructed reference frames can be used to generate motion compensated predictions. Normal inter prediction modes include Skip, Merge and Inter Advanced Motion Vector Prediction (AMVP) modes. Skip and Merge modes obtains the motion information from spatially neighboring blocks (spatial candidates) or a temporal co-located block (temporal candidate). When a PU is coded by Skip or Merge mode, no motion information is coded, instead, only the index of the selected candidate is coded. For Skip mode, the residual signal is forced to be zero and not coded. If a particular block is encoded as Skip or Merge, a candidate index is signaled to indicate which candidate among the candidate set is used for merging. Each merged PU reuses the MV, prediction direction, and reference picture index of the selected candidate.

Figure 1:
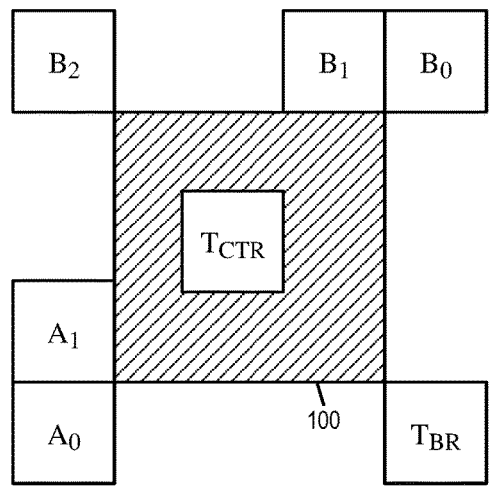
FIG. 1 illustrates the motion candidates of merge mode. The figure shows a current block of a video picture or frame being encoded or decoded by a video codec.

FIG. 1 illustrates the motion candidates of merge mode. The figure shows a current block 100 of a video picture or frame being encoded or decoded by a video codec. As illustrated, up to four spatial MV candidates are derived from spatial neighbors A0, A1, B0 and B1, and one temporal MV candidate is derived from TBR or TCTR (TBR is used first, if TBR is not available, TCTR is used instead). If any of the four spatial MV candidates is not available, the position B2 is then used to derive MV candidate as a replacement. After the derivation process of the four spatial MV candidates and one temporal MV candidate, removing redundancy (pruning) is applied in some embodiments to remove redundant MV candidates. If after removing redundancy (pruning), the number of available MV candidates is smaller than five, three types of additional candidates are derived and are added to the candidate set (candidate list). A video encoder selects one final candidate within the candidate set for Skip, or Merge modes based on the rate-distortion optimization (RDO) decision and transmits the index to a video decoder. (Skip mode and merge mode are collectively referred to as "merge mode" in this document.)

When a PU is coded in Inter AMVP mode, motion-compensated prediction is performed with transmitted motion vector differences (MVDs) that can be used together with Motion Vector Predictors (MVPs) for deriving motion vectors (MVs). To decide MVP in Inter AMVP mode, the advanced motion vector prediction (AMVP) scheme is used to select a motion vector predictor among an AMVP candidate set including two spatial MVPs and one temporal MVP. So, in AMVP mode, MVP index for MVP and the corresponding MVDs are required to be encoded and transmitted. In addition, the inter prediction direction to specify the prediction directions among bi-prediction, and uni-prediction which are list 0 (L0) and list 1 (L1), accompanied with the reference frame index for each list should also be encoded and transmitted.

When a PU is coded in either Skip or Merge mode, no motion information is transmitted except the Merge index of the selected candidate. That is because the Skip and Merge modes utilize motion inference methods (MV=MVP+MVD where MVD is zero) to obtain the motion information from spatially neighboring blocks (spatial candidates) or a temporal block (temporal candidate) located in a co-located picture where the co-located picture is the first reference picture in list 0 or list 1, which is signaled in the slice header. In the case of a Skip PU, the residual signal is also omitted. To determine the Merge index for the Skip and Merge modes, the Merge scheme is used to select a motion vector predictor among a Merge candidate set containing four spatial MVPs and one temporal MVP.

FIG. 1 also shows the MVP candidates set for inter-prediction modes, i.e., the neighboring PUs that are referenced for deriving the spatial and temporal MVPs for both AMVP and Merge scheme. The current block 100 (which can be a PU or a CU) references neighboring blocks to derive the spatial and temporal MVPs as an MVP list or candidate list for AMVP mode, merge mode or skip mode.

For AMVP mode, the left MVP is the first available one from $A_0$, $A_1$, the top MVP is the first available one from $B_0$, $B_1$, $B_2$, and the temporal MVP is the first available one from $T_{BR}$ or $T_{CTR}$ ($T_{BR}$ is used first, if $T_{BR}$ is not available, $T_{CTR}$ is used instead). If the left MVP is not available and the top MVP is not scaled MVP, the second top MVP can be derived if there is a scaled MVP among $B_0$, $B_1$, and $B_2$. Therefore, after the derivation process of the two spatial MVPs and one temporal MVP, only the first two MVPs can be included in the candidate list. If after removing redundancy, the number of available MVPs is less than two, zero vector candidates are added to the candidates list.

For skip mode and merge mode, up to four spatial merge indices are derived from $A_0$, $A_1$, $B_0$ and $B_1$, and one temporal merge index is derived from $T_{BR}$ or $T_{CTR}$ ($T_{BR}$ is used first, if $T_{BR}$ is not available, $T_{CTR}$ is used instead). If any of the four spatial merge index is not available, the position $B_2$ is used to derive merge index as a replacement. After the deriving four spatial merge indices and one temporal merge index, redundant merge indices are removed. If the number of non-redundant merge indices is less than five, additional candidates may be derived from original candidates and added to the candidates list. There are three types of derived candidates:

1. Combined bi-predictive merge candidate (derived candidate type 1)
2. Scaled bi-predictive merge candidate (derived candidate type 2)
3. Zero vector merge/AMVP candidate (derived candidate type 3)

Figure 2:
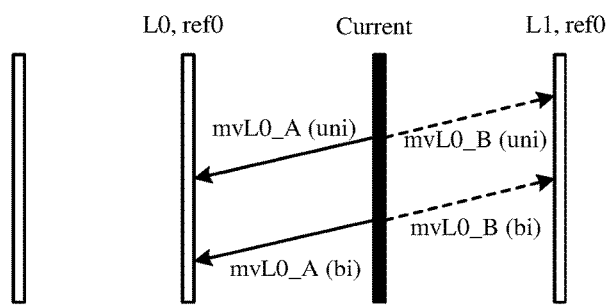
FIG. 2 illustrates a merge candidates list that includes combined bi-predictive merge candidates.

For derived candidate type 1, combined bi-predictive merge candidates are created by combining original merge candidates. Specifically, if the current slice is a B slice, a further merge candidate can be generated by combining candidates from List 0 and List 1. FIG. 2 illustrates a merge candidates list that includes combined bi-predictive merge candidates. As illustrated, two original candidates having mvL0 (the motion vector in list 0) and refIdxL0 (the reference picture index in list 0) or mvL1 (the motion vector in list 1) and refIdxL1 (the reference picture index in list 1), are used to create bi-predictive Merge candidates.

Figures 3, 4:
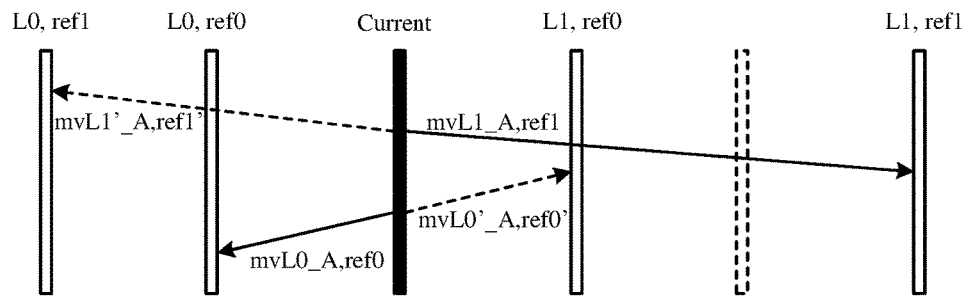
FIG. 3 illustrates a merge candidates list that includes scaled merge candidates.
FIG. 4 illustrates an example in which zero vector candidates are added to a merge candidates list or an AMVP candidates list.

For derived candidate type 2, scaled merge candidates are created by scaling original merge candidates. FIG. 3 illustrates a merge candidates list that includes scaled merge candidates. As illustrated, an original merge candidate has mvLX (the motion vector in list X, X can be 0 or 1) and refIdxLX (the reference picture index in list X, X can be 0 or 1). For example, an original candidate A is a list 0 uni-predicted MV with mvL0_A and reference picture index ref0. Candidate A is initially copied to list L1 as having reference picture index ref0'. The scaled MV mvL0'_A is calculated by scaling mvL0_A based on ref0 and ref0'. A scaled bi-predictive Merge candidate having mvL0_A and ref0 in list L0 and mvL0'_A and ref0' in list L1 is created and added to the merge candidates list. Likewise, a scaled bi-predictive merge candidate which has mvL1'_A and ref1' in List 0 and mvL1_A, ref1 in List 1 is created and added to the merge candidates list.

For derived candidate type 3, zero vector candidates are created by combining zero vectors and reference indices. If a created zero vector candidate is not a duplicate, it is added to the merge/AMVP candidates list. FIG. 4 illustrates an example in which zero vector candidates are added to a merge candidates list or an AMVP candidates list.

b. Intra Block Copy Prediction

Intra Block Copy (IBC) is also referred to as Current Picture Referencing (CPR). IBC prediction is similar to inter prediction (inter mode), except that the reference picture providing the prediction is the current decoded frame or the current picture that includes the current block being coded. An IBC (or CPR) motion vector is one that refers to the already-reconstructed reference samples in the current picture. In some embodiments, an IBC-coded CU is signalled as an inter-coded block. In other words, the current (partially) decoded picture is treated as a reference picture. By referring to such a reference picture, the current block can be predicted from a reference block of the same picture, in the same manner as motion compensation. For some embodiments, the differences between a IBC coded block and a normal motion compensation (MC) coded block include the followings: (1) Block vectors (the displacement vector in IBC) have only integer resolution, no interpolation needed for luma or chroma; (2) Block vectors are not involved in temporal motion vector prediction; (3) Block vectors and motion vectors are not used to predict each other; and (4) A valid block vector has some constraints such that it can only point to a subset of the current picture. In some embodiments, in order to reduce the implementation cost, the reference samples for IBC mode are from the already reconstructed part of the current slice or tile and meet the WPP parallel processing conditions. In some embodiments, to reduce memory consumption and decoder complexity, the video codec allows only the reconstructed portion of the current CTU be used for IBC mode. This restriction allows the IBC mode to be implemented using local on-chip memory for hardware implementations.

Further detail of IBC prediction can be found in Joint Video Experts Team (JVET) of ITU-T SG 16 WP 3 and ISO/IEC JTC 1/SC 29/WG 11, 11th Meeting: Ljubljana, SI, 10-18 Jul. 2018; Document: JVET-K0076; CE8-2.2: Current picture referencing using reference index signaling. Further detail of IBC mode can also be found in X. Xu, S. Liu, T. Chuang, Y. Huang, S. Lei, K. Rapaka, C. Pang, V. Seregin, Y. Wang, and M. Karczewicz, "Intra Block Copy in HEVC Screen Content Coding Extensions," IEEE J. Emerg. Sel. Topics Circuits Syst., vol. 6, no. 4, pp. 409-419, 2016.

c. History-Based Motion Vector Prediction

In some embodiments, the motion information used to generate a hypothesis of inter prediction can be acquired through referencing previous coded motion information in a history-based scheme, also called history-based motion vector prediction (HMVP). A HMVP candidate is defined as the motion information of a previously coded block. The video codec maintains a table with multiple HMVP candidates during the encoding/decoding process. The table is emptied when a new slice is encountered.

II. Simplified Merge List for IBC

For IBC merge mode, a list of merge candidates is generated to include merge indices that are associated with only two of the plurality of the coded spatially adjacent neighboring blocks of the current block. One merge candidate will be selected from the list of merge candidates to be used in decoding the current block.

In fact, when generating the list of merge candidates, several types of merge candidates are inserted into the merge list if candidate exists. The types of merge candidates that can be inserted into the merge list may include spatial merge candidate (i.e. the merge indices that are associated with only two of the plurality of the coded spatially adjacent neighboring blocks), temporal merge candidate, history-based (e.g., HMVP) merge candidate, pairwise average merge candidate, Sub-CU merge candidate or default merge candidate. A pruning process is also performed on the merge list.

In some embodiments, for IBC merge mode, the video codec simplifies merge list construction by excluding some merge candidates or by reducing the pruning process. Simplified merge list construction can also be applied according to some constraints.

In some embodiments, for IBC mode, one or some or all merge candidates are excluded or omitted in merge candidate list construction. In other words, the merge candidate list constructed for IBC mode is without one or some merge candidates or have only a subset of the merge candidates (compared to the available merge candidates in regular inter prediction merge mode.) For example, in some embodiments, one or some or all spatial merge candidates are excluded or omitted in merge candidate list construction of IBC prediction, or that the merge candidate list constructed for IBC prediction mode is without one or some spatial merge candidates that would be included in regular inter prediction merge mode, or have only a subset of the spatial merge candidates when compared to regular (or non-IBC) merge mode.

Figure 5:
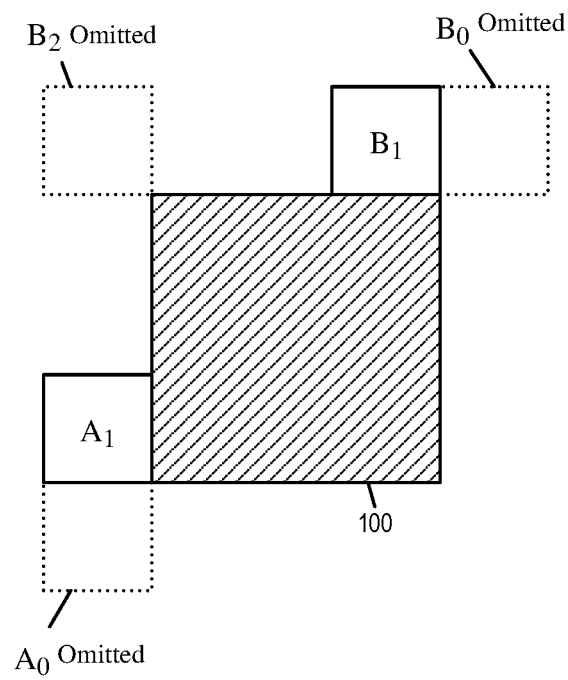
FIG. 5 illustrates an example simplified merge candidate list for IBC mode when coding the current block.

FIG. 5 illustrates an example simplified merge candidate list for IBC mode when coding the current block 100. As illustrated, only two spatial merge candidates A1 and B1 are used as merge candidates for IBC mode, while other spatial merge candidates A0, B0, and B2 are omitted, excluded, or not included in the merge candidate list. In other words, of all the spatial neighbors that are coded before the current block 100 (i.e., above neighbors B0, B1, B2 and left neighbors A1 and A0), only the spatial neighbors that are immediately above (B1) and immediately to the left (A1) are included. Other spatial neighbors (B0, B2, A0) of the current block 100 are not used as merge mode candidate for IBC, even though those spatial neighbors are already coded before the current block 100.

In some embodiments, some or all history-based (e.g., HMVP) candidates are excluded or omitted in merge candidate list construction. As mentioned, to implement HMVP, the video codec may maintain a motion history table that stores the motion information that were used for previously coded blocks for the current slice. To generate the list of merge candidates for coding the current block in IBC prediction mode, the video codec may include only a subset of the motion information stored in the motion history table in the list of merge candidates for IBC mode.

In some embodiments, for IBC mode, one or some or all temporal merge candidates are excluded or omitted in merge candidate list construction. In some embodiments, one or some or all pairwise average merge candidate is excluded or omitted in merge candidate list construction. In some embodiments, one or some or all Sub-CU merge candidates are excluded or omitted in merge candidate list construction. In some embodiments, the default merge candidate is excluded or omitted in merge candidate list construction.

In some embodiments, for IBC merge mode, a pruning process (redundancy remove process) is simplified or not performed for merge candidate construction. In some embodiments, the pruning process of spatial merge candidates is simplified or not performed in merge candidate list construction. In some embodiments, the pruning process of temporal merge candidates is simplified or not performed in merge candidate list construction. In some embodiments, the pruning process of pairwise average merge candidates is simplified or not performed in merge candidate list construction. In some embodiment, the pruning process of Sub-CU merge candidate is simplified or not performed in merge candidate list construction. In some embodiment, the pruning process of default merge candidates is simplified or not performed in merge candidate list construction. In some embodiments, the pruning process of history-based (e.g., HMVP) candidates is simplified or not performed in merge candidate list construction. When this pruning process is simplified, only first N HMVP candidates in the HMVP candidate list are (is) compared with the list of merge candidates (for detecting redundancy or checking for redundant candidates). In some embodiments, the compared HMVP candidate is added into the list of merge candidates when the comparison result indicates that the compared HMVP candidate is different from the candidates in the list of merge candidates. When the pruning process is not performed, the previous comparing is not performed before the HMVP candidates are included in the list of merge candidates. In short, pruning processes of the various types of merge candidates stated herein may be simplified or not performed. When the pruning process of any of the various types of merge candidates is not performed, that type of merge candidates can be included in the list of merge candidates without comparing redundancy. For some embodiments, this simplified pruning process do not contradict the simplification of generation of merge candidates and can be executed in the same process.

In some embodiments, for IBC merge mode, one or some merge candidates are excluded in merge candidate list construction according to some CU width or height. In other words, when generating the merge candidate list, the video codec determines which merge candidate to include or omit based on properties of the current CU.

In some embodiments, one or some or all spatial merge candidates are excluded in merge candidate list construction according to some CU width or height. In some embodiments, one or some or all temporal merge candidate are excluded or omitted in merge candidate list construction according to some CU width or height. In some embodiments, one or some or all history-based (e.g., HMVP) merge candidate are excluded or omitted in merge candidate list construction according to some CU width or height. In some embodiments, one or some or all pairwise average merge candidate is excluded or omitted in merge candidate list construction according to some CU width or height. In some embodiment, one or some or all Sub-CU merge candidates are excluded or omitted in merge candidate list construction according to some CU width or height. In some embodiments, one or some or all default merge candidates are excluded or omitted in merge candidate list construction according to some CU width or height. In some embodiments, the pruning process is simplified or not performed in merge candidate list construction according to some CU width or height.

In some embodiments, in IBC merge mode, one or some candidates are excluded in merge candidate list construction according to some CU area. In some embodiments, one or some or all spatial merge candidates are excluded in merge candidate list construction according to some CU area. In some embodiments, one or some or all temporal merge candidates are excluded in merge candidate list construction according to some CU area. In some embodiments, one or some or all history-based (e.g., HMVP) merge candidates are excluded in merge candidate list construction according to some CU area. In some embodiments, one or some or all pairwise average merge candidates are excluded in merge candidate list construction according to some CU area. In some embodiments, one or some or all Sub-CU merge candidate are excluded in merge candidate list construction according to some CU area. In some embodiments, a default merge candidate is excluded in merge candidate list construction according to some CU area. In another embodiment, pruning process is simplified or not performed in merge candidate list construction according to some CU area.

Any of the foregoing proposed methods can be implemented in encoders and/or decoders. For example, any of the proposed methods can be implemented in predictor derivation module of an encoder, and/or a predictor derivation module of a decoder. Alternatively, any of the proposed methods can be implemented as a circuit coupled to the predictor derivation module of the encoder and/or the predictor derivation module of the decoder, so as to provide the information needed by the predictor derivation module.

III. Example Video Encoder

Figure 6:
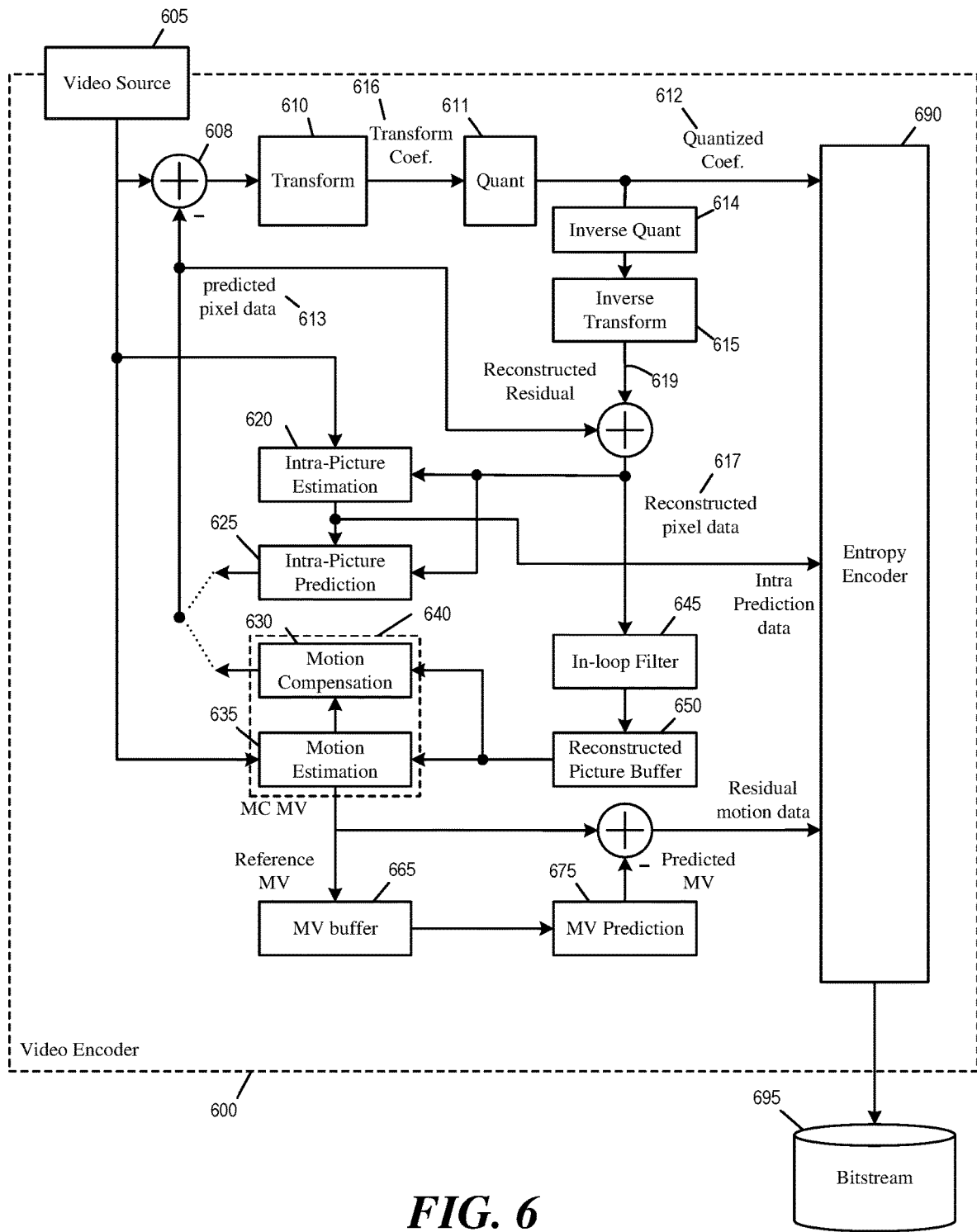
FIG. 6 illustrates an example video encoder that may use simplified merge list construction for encoding pixel blocks in IBC mode.

FIG. 6 illustrates an example video encoder 600 that may use simplified merge list construction for encoding pixel blocks in IBC mode. As illustrated, the video encoder 600 receives input video signal from a video source 605 and encodes the signal into bitstream 695. The video encoder 600 has several components or modules for encoding the signal from the video source 605, at least including some components selected from a transform module 610, a quantization module 611, an inverse quantization module 614, an inverse transform module 615, an intra-picture estimation module 620, an intra-prediction module 625, a motion compensation module 630, a motion estimation module 635, an in-loop filter 645, a reconstructed picture buffer 650, a MV buffer 665, and a MV prediction module 675, and an entropy encoder 690. The motion compensation module 630 and the motion estimation module 635 are part of an inter-prediction module 640.

In some embodiments, the modules 610-690 are modules of software instructions being executed by one or more processing units (e.g., a processor) of a computing device or electronic apparatus. In some embodiments, the modules 610-690 are modules of hardware circuits implemented by one or more integrated circuits (ICs) of an electronic apparatus. Though the modules 610-690 are illustrated as being separate modules, some of the modules can be combined into a single module.

The video source 605 provides a raw video signal that presents pixel data of each video frame without compression. A subtractor 608 computes the difference between the raw video pixel data of the video source 605 and the predicted pixel data 613 from the motion compensation module 630 or intra-prediction module 625. The transform module 610 converts the difference (or the residual pixel data or residual signal 609) into transform coefficients (e.g., by performing Discrete Cosine Transform, or DCT). The quantization module 611 quantizes the transform coefficients into quantized data (or quantized coefficients) 612, which is encoded into the bitstream 695 by the entropy encoder 690.

The inverse quantization module 614 de-quantizes the quantized data (or quantized coefficients) 612 to obtain transform coefficients, and the inverse transform module 615 performs inverse transform on the transform coefficients to produce reconstructed residual 619. The reconstructed residual 619 is added with the predicted pixel data 613 to produce reconstructed pixel data 617. In some embodiments, the reconstructed pixel data 617 is temporarily stored in a line buffer (not illustrated) for intra-picture prediction and spatial MV prediction. The reconstructed pixels are filtered by the in-loop filter 645 and stored in the reconstructed picture buffer 650. In some embodiments, the reconstructed picture buffer 650 is a storage external to the video encoder 600. In some embodiments, the reconstructed picture buffer 650 is a storage internal to the video encoder 600.

The intra-picture estimation module 620 performs intra-prediction based on the reconstructed pixel data 617 to produce intra prediction data. The intra-prediction data is provided to the entropy encoder 690 to be encoded into bitstream 695. The intra-prediction data is also used by the intra-prediction module 625 to produce the predicted pixel data 613.

The motion estimation module 635 performs inter-prediction by producing MVs to reference pixel data of previously decoded frames stored in the reconstructed picture buffer 650. These MVs are provided to the motion compensation module 630 to produce predicted pixel data.

Instead of encoding the complete actual MVs in the bitstream, the video encoder 600 uses MV prediction to generate predicted MVs, and the difference between the MVs used for motion compensation and the predicted MVs is encoded as residual motion data and stored in the bitstream 695.

The MV prediction module 675 generates the predicted MVs based on reference MVs that were generated for encoding previously video frames, i.e., the motion compensation MVs that were used to perform motion compensation. The MV prediction module 675 retrieves reference MVs from previous video frames from the MV buffer 665. The video encoder 600 stores the MVs generated for the current video frame in the MV buffer 665 as reference MVs for generating predicted MVs.

The MV prediction module 675 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 695 by the entropy encoder 690.

The entropy encoder 690 encodes various parameters and data into the bitstream 695 by using entropy-coding techniques such as context-adaptive binary arithmetic coding (CABAC) or Huffman encoding. The entropy encoder 690 encodes various header elements, flags, along with the quantized transform coefficients 612, and the residual motion data as syntax elements into the bitstream 695. The bitstream 695 is in turn stored in a storage device or transmitted to a decoder over a communications medium such as a network.

The in-loop filter 645 performs filtering or smoothing operations on the reconstructed pixel data 617 to reduce the artifacts of coding, particularly at boundaries of pixel blocks. In some embodiments, the filtering operation performed includes sample adaptive offset (SAO). In some embodiment, the filtering operations include adaptive loop filter (ALF).

To implement IBC mode, the motion estimation module 635 may search the already coded portion of the current picture stored in the reconstructed picture buffer 650 to determine a motion vector and the corresponding motion information that references pixels of the current picture. The motion compensation module 630 may implement a list of merge candidates based on motion information that are stored in the MV buffer 665, including motion information of (that were used to code) the spatial neighbors of the current block. When IBC mode is used to encode the current block, the list of merge candidates may include some but not all spatial neighbors of the current block as spatial merge candidates. The video encoder 600 may also apply simplified pruning to the list of merge candidates.

Figure 7:
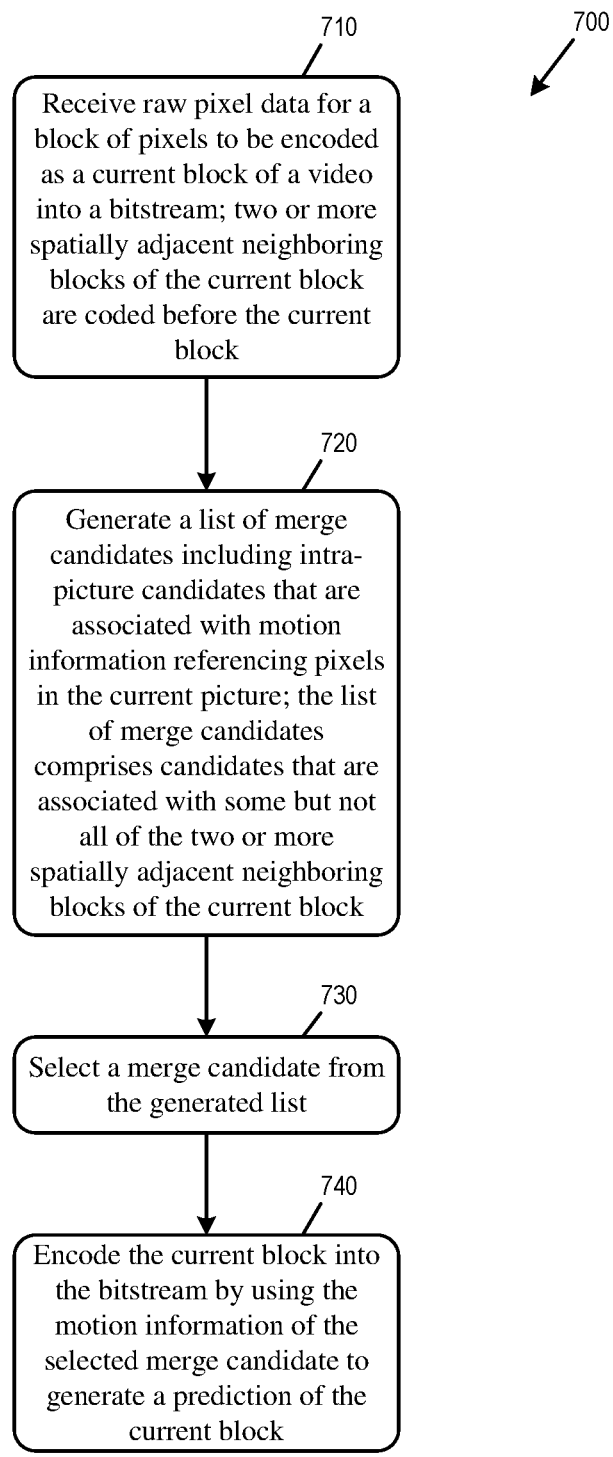
FIG. 7 conceptually illustrates a process for encoding a current block by using a simplified list of merge candidates for IBC mode.

FIG. 7 conceptually illustrates a process 700 for encoding the current block by using a simplified list of merge candidates for IBC mode. In some embodiments, one or more processing units (e.g., a processor) of a computing device implementing the encoder 600 performs the process 700 by executing instructions stored in a computer readable medium. In some embodiments, an electronic apparatus implementing the encoder 600 performs the process 700. In some embodiments, the process 700 is performed at the inter-prediction module 640.

The encoder receives (at 710) raw pixel data for a block of pixels to be encoded as a current block of a current picture of a video. Two or more spatially adjacent neighboring blocks of the current block are coded before the current block. In the example of FIG. 1, the spatial neighbors A0, A1, B0, B1, and B2 are coded before the current block 100, which are PUs or CUs above and/or left of the current block.

The encoder generates (at 720) a list of merge candidates. The list of merge candidates may include spatial merge candidates, temporal merge candidates, history-based (e.g., HMVP) merge candidates, pairwise average merge candidates, Sub-CU merge candidates and/or a default merge candidate. The encoder may determine which merge candidate to include in the list based on a property (e.g., size, width, height, aspect ratio) of the current block.

A pruning process is also performed on the merge list. The pruning process may be simplified such that pruning is not performed for certain types of merge candidates. For example, in some embodiments, the pruning process of history-based (e.g., HMVP) candidates is simplified or not performed in merge candidate list construction. When the pruning process is simplified, only the first N HMVP candidates in the HMVP candidate list are (is) compared with the list of merge candidates. In some embodiments, N is equal to 1. In other words, no more than one HMVP candidate is compared with the list of merge candidates in this embodiment. Then, for example, the compared HMVP candidate is added into the list of merge candidates when the comparing result indicates that the compared HMVP candidate is different from the candidates in the list of merge candidates. When the pruning process is not performed, the previous comparing is not performed before the HMVP candidates are included in the list of merge candidates. In short, pruning processes of the various types of merge candidates stated herein may be simplified or not performed. When the pruning process of any type of the various types of merge candidates is not performed, that type of merge candidates can be included in the list of merge candidates without comparing redundancy (comparing candidates to identify redundancy).

Since the list of merge candidates is generated for IBC mode, the list includes intra picture candidates that are associated with motion information referencing pixels in the current picture. In some embodiments, the intra picture candidates include candidates that are associated with some but not all of the two or more spatially adjacent neighboring blocks of the current block. For example, the intra picture candidates of the merge candidate list may include only spatial neighbors A1 and B1 but not spatial neighbors A0, B0, and B2. In other words, some but not all of the spatial merge candidates of the current block are included in the list of merge candidates for IBC.

The encoder selects (at 730) a merge candidate from the generated list, e.g., by generating an index that is to be included in the bitstream 695 as a syntax element. The encoder then encodes (at 740) the current block by using the motion information of the selected merge candidate to generate a prediction of the current block.

IV. Example Video Decoder

Figure 8:
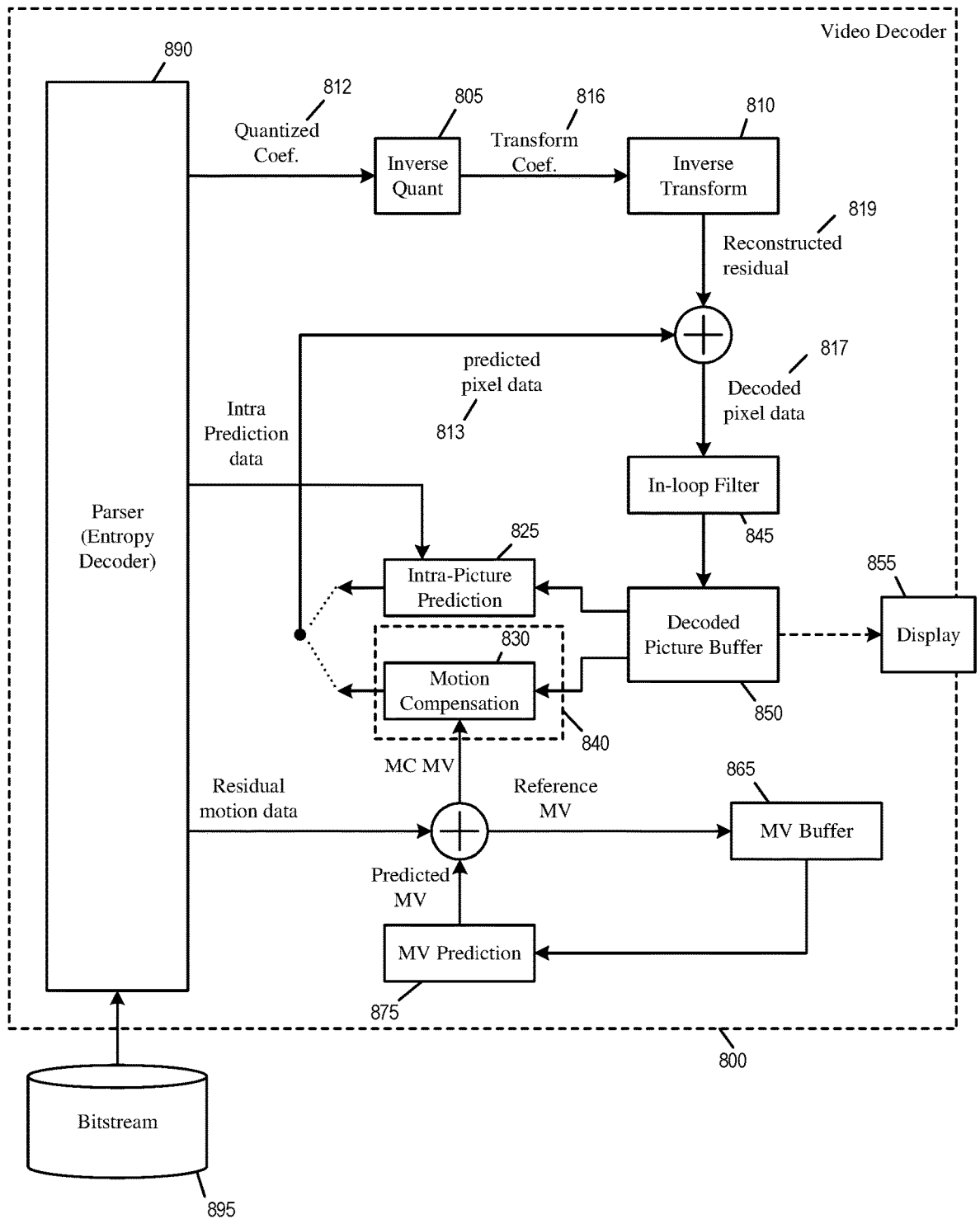
FIG. 8 illustrates an example video decoder that may use simplified merge list construction for decoding pixel blocks in IBC mode.

FIG. 8 illustrates an example video decoder 800 that may use simplified merge list construction for decoding pixel blocks in IBC mode. As illustrated, the video decoder 800 is an image-decoding or video-decoding circuit that receives a bitstream 895 and decodes the content of the bitstream into pixel data of video frames for display. The video decoder 800 has several components or modules for decoding the bitstream 895, including some components selected from an inverse quantization module 805, an inverse transform module 810, an intra-prediction module 825, a motion compensation module 830, an in-loop filter 845, a decoded picture buffer 850, a MV buffer 865, a MV prediction module 875, and a parser 890. The motion compensation module 830 is part of an inter-prediction module 840.

In some embodiments, the modules 810-890 are modules of software instructions being executed by one or more processing units (e.g., a processor) of a computing device. In some embodiments, the modules 810-890 are modules of hardware circuits implemented by one or more ICs of an electronic apparatus. Though the modules 810-890 are illustrated as being separate modules, some of the modules can be combined into a single module.

The parser 890 (or entropy decoder) receives the bitstream 895 and performs initial parsing according to the syntax defined by a video-coding or image-coding standard. The parsed syntax element includes various header elements, flags, as well as quantized data (or quantized coefficients) 812. The parser 890 parses out the various syntax elements by using entropy-coding techniques such as context-adaptive binary arithmetic coding (CABAC) or Huffman encoding.

The inverse quantization module 805 de-quantizes the quantized data (or quantized coefficients) 812 to obtain transform coefficients, and the inverse transform module 810 performs inverse transform on the transform coefficients 816 to produce reconstructed residual signal 819. The reconstructed residual signal 819 is added with predicted pixel data 813 from the intra-prediction module 825 or the motion compensation module 830 to produce decoded pixel data 817. The decoded pixels data are filtered by the in-loop filter 845 and stored in the decoded picture buffer 850. In some embodiments, the decoded picture buffer 850 is a storage external to the video decoder 800. In some embodiments, the decoded picture buffer 850 is a storage internal to the video decoder 800.

The intra-prediction module 825 receives intra-prediction data from bitstream 895 and according to which, produces the predicted pixel data 813 from the decoded pixel data 817 stored in the decoded picture buffer 850. In some embodiments, the decoded pixel data 817 is also stored in a line buffer (not illustrated) for intra-picture prediction and spatial MV prediction.

In some embodiments, the content of the decoded picture buffer 850 is used for display. A display device 855 either retrieves the content of the decoded picture buffer 850 for display directly or retrieves the content of the decoded picture buffer to a display buffer. In some embodiments, the display device receives pixel values from the decoded picture buffer 850 through a pixel transport.

The motion compensation module 830 produces predicted pixel data 813 from the decoded pixel data 817 stored in the decoded picture buffer 850 according to motion compensation MVs (MC MVs). These motion compensation MVs are decoded by adding the residual motion data received from the bitstream 895 with predicted MVs received from the MV prediction module 875.

The MV prediction module 875 generates the predicted MVs based on reference MVs that were generated for decoding previous video frames, e.g., the motion compensation MVs that were used to perform motion compensation. The MV prediction module 875 retrieves the reference MVs of previous video frames from the MV buffer 865. The video decoder 800 stores the motion compensation MVs generated for decoding the current video frame in the MV buffer 865 as reference MVs for producing predicted MVs.

The in-loop filter 845 performs filtering or smoothing operations on the decoded pixel data 817 to reduce the artifacts of coding, particularly at boundaries of pixel blocks. In some embodiments, the filtering operation performed includes sample adaptive offset (SAO). In some embodiment, the filtering operations include adaptive loop filter (ALF).

To implement IBC mode, the motion compensation module 830 may implement a list of merge candidates that include intra picture candidates that are associated with motion information referencing pixels in the current picture. The list of merge candidates are based on motion information that are stored in the MV buffer 865, including motion information of (that were used to code) the spatial neighbors of the current block. When IBC mode is used to decode the current block, the list of merge candidates may include some but not all spatial neighbors of the current block as spatial merge candidates. The video decoder 800 may also apply simplified pruning to the list of merge candidates.

Figure 9:
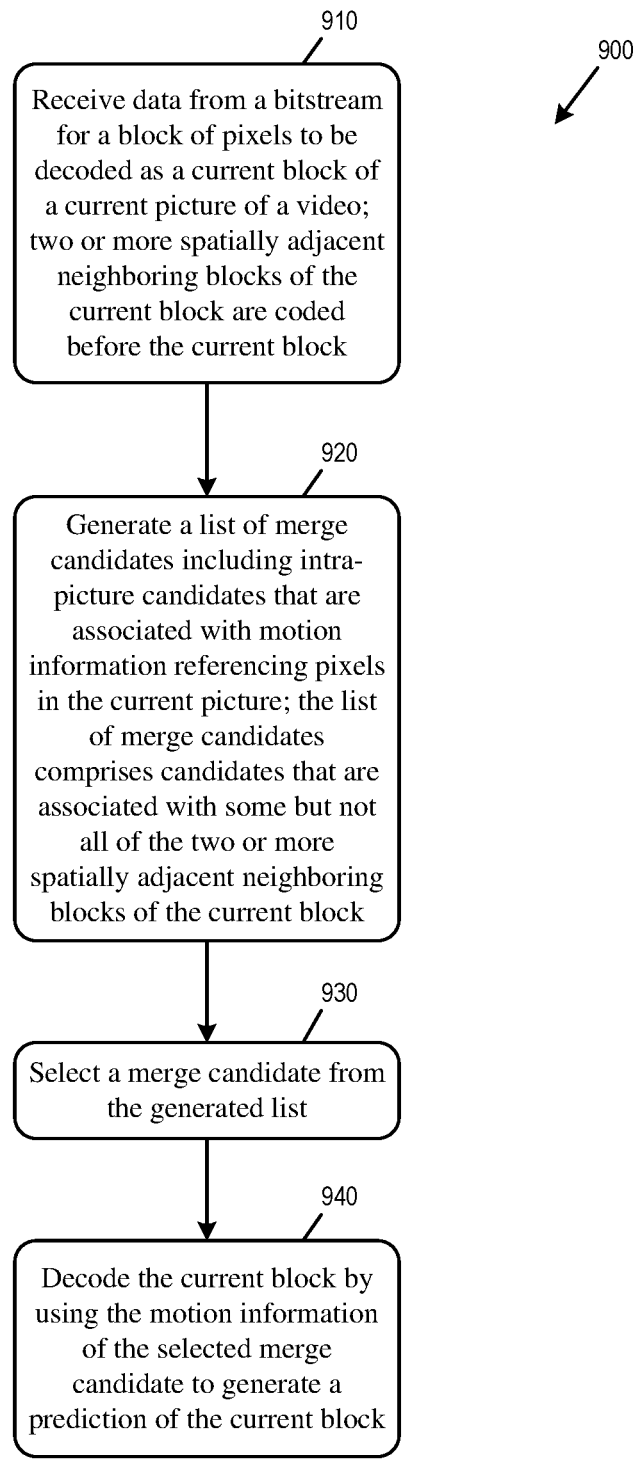
FIG. 9 conceptually illustrates a process for decoding the current block by using a simplified list of merge candidates for IBC mode.

FIG. 9 conceptually illustrates a process 900 for decoding the current block by using a simplified list of merge candidates for IBC mode. In some embodiments, one or more processing units (e.g., a processor) of a computing device implementing the decoder 800 performs the process 900 by executing instructions stored in a computer readable medium. In some embodiments, an electronic apparatus implementing the decoder 800 performs the process 900. In some embodiments, the process 900 is performed at the inter-prediction module 840.

The decoder receives (at 910) data from a bitstream for a block of pixels to be decoded as a current block of a current picture of a video. Two or more spatially adjacent neighboring blocks of the current block are coded before the current block. In the example of FIG. 1, the spatial neighbors A0, A1, B0, B1, and B2 are coded before the current block 100.

The decoder generates (at 920) a list of merge candidates. The list of merge candidates may include spatial merge candidates, temporal merge candidates, history-based (e.g., HMVP) merge candidates, pairwise average merge candidates, Sub-CU merge candidates and/or a default merge candidate. The decoder may determine which merge candidate to include in the list based on a property (e.g., size, width, height, aspect ratio) of the current block.

A pruning process is also performed on the merge list. The pruning process may be simplified such that at least one redundant candidate in the list of merge candidates is not removed. The pruning process may also be simplified such that pruning is not performed for certain types of merge candidates. For example, in some embodiments, the simplified pruning process may not remove redundancy related to HMVP candidates.

Since the list of merge candidates is generated for IBC mode, the list includes intra picture candidates that are associated with motion information referencing pixels in the current picture. In some embodiments, the intra picture candidates include candidates that are associated with some but not all of the two or more spatially adjacent neighboring blocks of the current block. For example, the intra picture candidates of the merge candidate list may include only spatial neighbors A1 and B1 but not spatial neighbors A0, B0, and B2. In other words, some but not all of the spatial merge candidates of the current block is included in the list of merge candidates for IBC.

In some embodiments, some of the merge candidates that are available for merge mode are not included in the list of merge candidates for IBC mode. For example, in some embodiments, at least one HMVP candidate stored for the current slice is not included in the list of merge candidates for the current block for IBC mode.

The decoder selects (at 930) a merge candidate from the generated list, e.g., based on an index that is provided by a syntax element that is parsed from the bitstream 895. The decoder then decodes (at 940) the current block by using the motion information of the selected merge candidate to generate a prediction of the current block.

V. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 10:
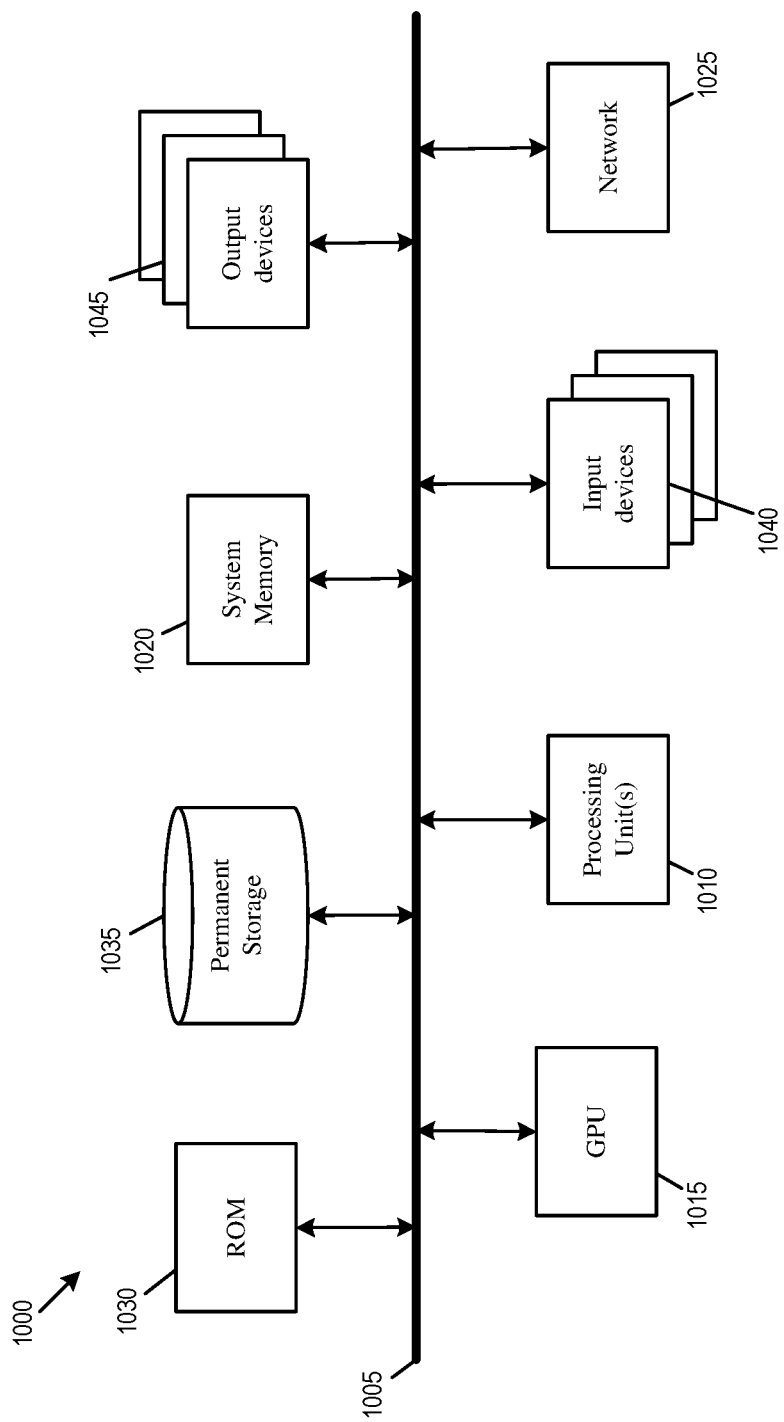
FIG. 10 conceptually illustrates an electronic system with which some embodiments of the present disclosure are implemented.

FIG. 10 conceptually illustrates an electronic system 1000 with which some embodiments of the present disclosure are implemented. The electronic system 1000 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1000 includes a bus 1005, processing unit(s) 1010, a graphics-processing unit (GPU) 1015, a system memory 1020, a network 1025, a read-only memory 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the GPU 1015, the read-only memory 1030, the system memory 1020, and the permanent storage device 1035.

From these various memory units, the processing unit(s) 1010 retrieves instructions to execute and data to process in order to execute the processes of the present disclosure. The processing unit(s) may be a single processor or a multi-core processor in different embodiments. Some instructions are passed to and executed by the GPU 1015. The GPU 1015 can offload various computations or complement the image processing provided by the processing unit(s) 1010.

The read-only-memory (ROM) 1030 stores static data and instructions that are used by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the present disclosure use a mass-storage device (such as a magnetic or optical disk and its corresponding disk drive) as the permanent storage device 1035.

Other embodiments use a removable storage device (such as a floppy disk, flash memory device, etc., and its corresponding disk drive) as the permanent storage device. Like the permanent storage device 1035, the system memory 1020 is a read-and-write memory device. However, unlike storage device 1035, the system memory 1020 is a volatile read-and-write memory, such a random access memory. The system memory 1020 stores some of the instructions and data that the processor uses at runtime. In some embodiments, processes in accordance with the present disclosure are stored in the system memory 1020, the permanent storage device 1035, and/or the read-only memory 1030. For example, the various memory units include instructions for processing multimedia clips in accordance with some embodiments. From these various memory units, the processing unit(s) 1010 retrieves instructions to execute and data to process in order to execute the processes of some embodiments.

The bus 1005 also connects to the input and output devices 1040 and 1045. The input devices 1040 enable the user to communicate information and select commands to the electronic system. The input devices 1040 include alphanumeric keyboards and pointing devices (also called "cursor control devices"), cameras (e.g., webcams), microphones or similar devices for receiving voice commands, etc. The output devices 1045 display images generated by the electronic system or otherwise output data. The output devices 1045 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 10, bus 1005 also couples electronic system 1000 to a network 1025 through a network adapter (not shown). In this manner, the computer can be a part of a network of computers (such as a local area network ("LAN"), a wide area network ("WAN"), or an Intranet, or a network of networks, such as the Internet. Any or all components of electronic system 1000 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIG. 7 and FIG. 9) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A video decoding method comprising:
    receiving data from a bitstream for a block of pixels to be decoded as a current block of a current picture of a video, wherein a plurality of spatially adjacent neighboring blocks of the current block are coded before the current block;
    generating a list of merge candidates including intra picture candidates that are associated with motion information referencing pixels in the current picture, the intra picture candidates comprising spatial merge candidates that are associated with the plurality of spatially adjacent neighboring blocks of the current block, the list of merge candidates comprising at most two spatial merge candidates,
    wherein whether a history-based motion vector prediction (HMVP) candidate is included in the list of merge candidates or not is dependent on whether at least one HMVP candidate is available, and whether a default merge candidate is included in the list of merge candidates or not is dependent on a number of the spatial merge candidates and the HMVP candidate in the list of merge candidates;
    selecting a merge candidate from the generated list of merge candidates; and
    decoding the current block by using the motion information of the selected merge candidate,
    wherein generating the list of merge candidates comprises determining which merge candidate to include in the list based on a size of the current block.

2. The method of claim 1, wherein the plurality of spatially adjacent neighboring blocks of the current block are to the left and to the top of the current block, wherein generating the list of merge candidates comprises excluding some of the spatially adjacent neighboring blocks from the generated list of merge candidates.

3. The method of claim 1, wherein generating the list of merge candidates comprises including the intra picture candidates that are associated with one spatially adjacent neighboring block above the current block and one spatially adjacent neighboring block to the left of the current block and no other spatially adjacent neighboring block of the current block.

4. The method of claim 1, further comprising:
    maintaining a plurality of HMVP candidates for a current slice that includes the current block, each HMVP candidate associated with motion information of a previously coded block; and
    comparing no more than N HMVP candidates with the intra picture candidates for detecting redundancy.

5. The method of claim 4, wherein generating the list of merge candidates comprise a simplified pruning process that adds one or more of the plurality of the HMVP candidates into the list of merge candidates without comparing for detecting redundancy, the one or more of the plurality of the HMVP candidates including the HMVP candidate.

6. The method of claim 4, where N is equal to 1.

7. The method of claim 1, wherein the list of merge candidates includes the default merge candidate when the two spatial merge candidates and the HMVP candidate are not all available.

8. A video encoding method comprising:
    receiving raw pixel data for a block of pixels to be encoded as a current block of a current picture of a video into a bitstream, wherein a plurality of spatially adjacent neighboring blocks of the current block are coded before the current block;
    generating a list of merge candidates including intra picture candidates that are associated with motion information referencing pixels in the current picture, the intra picture candidates comprising spatial merge candidates that are associated with the plurality of spatially adjacent neighboring blocks of the current block, the list of merge candidates comprising at most two spatial merge candidates,
    wherein whether a history-based motion vector prediction (HMVP) candidate is included in the list of merge candidates or not is dependent on whether at least one HMVP candidate is available, and whether a default merge candidate is included in the list of merge candidates or not is dependent on a number of the spatial merge candidates and the HMVP candidate in the list of merge candidates;
    selecting a merge candidate from the generated list of merge candidates; and
    encoding the current block into the bitstream by using the motion information of the selected merge candidate, wherein generating the list of merge candidates comprises determining which merge candidate to include in the list based on a size of the current block.

9. An electronic apparatus comprising:
a video decoder circuit configured to perform operations comprising:
receiving data from a bitstream for a block of pixels to be decoded as a current block of a current picture of a video, wherein a plurality of spatially adjacent neighboring blocks of the current block are coded before the current block;
generating a list of merge candidates including intra picture candidates that are associated with motion information referencing pixels in the current picture, the intra picture candidates comprising spatial merge candidates that are associated with the plurality of spatially adjacent neighboring blocks of the current block, the list of merge candidates comprising at most two spatial merge candidates,
wherein whether a history-based motion vector prediction (HMVP) candidate is included in the list of merge candidates or not is dependent on whether at least one HMVP candidate is available, and whether a default merge candidate is included in the list of merge candidates or not is dependent on a number of the spatial merge candidates and the HMVP candidate in the list of merge candidates;
selecting a merge candidate from the generated list; and
decoding the current block by using the motion information of the selected merge candidate,
wherein generating the list of merge candidates comprises determining which merge candidate to include in the list based on a size of the current block.

10. The electronic apparatus of claim 9, wherein the list of merge candidates includes the default merge candidate when the two spatial merge candidates and the HMVP candidate are not all available.

11. A video decoding method comprising:
receiving data from a bitstream for a block of pixels to be decoded as a current block of a current picture of a video, wherein a plurality of spatially adjacent neighboring blocks of the current block are coded before the current block;
performing a merge mode in an intra block copy (IBC) prediction for the current block, comprising:
generating a list of merge candidates to include merge indices that are associated with spatial merge candidates that are associated with the plurality of the coded spatially adjacent neighboring blocks of the current block, the list of merge candidates comprising at most two spatial merge candidates,
wherein whether a history-based motion vector prediction (HMVP) candidate is included in the list of merge candidates or not is dependent on whether at least one HMVP candidate is available, and whether a default merge candidate is included in the list of merge candidates or not is dependent on a number of the spatial merge candidates and the HMVP candidate in the list of merge candidates;
selecting a merge candidate from the generated list of merge candidates; and
decoding the current block by using motion information of the selected merge candidate,
wherein generating the list of merge candidates comprises determining which merge candidate to include in the list based on a size of the current block.

12. The method of claim 11, wherein the step of generating the list of merge candidates comprises generating the list of merge candidates to include merge indices that are associated with only two of the neighboring blocks that are to the left and to the top of the current block.

13. The method of claim 11, further comprising:
maintaining a list of HMVP candidates for a current slice that includes the current block, each HMVP candidate associated with motion information of a previously coded block;
comparing only first N HMVP candidates from the list of HMVP candidates with the list of merge candidates; and
adding a compared HMVP candidate into the list of merge candidates when the comparing result indicates that the compared HMVP candidate is different from the candidates in the list of merge candidates, the compared HMVP candidate being the HMVP candidate.

14. The method of claim 13, wherein N is equal to 1.

15. The method of claim 11, further comprising:
maintaining a list of HMVP candidates for a current slice that includes the current block, each HMVP candidate associated with motion information of a previously coded block; and
adding one or more of the list of HMVP candidates into the list of merge candidates without comparing for detecting redundancy.

16. The method of claim 11, wherein the list of merge candidates includes the default merge candidate when the two spatial merge candidates and the HMVP candidate are not all available.

* * * * *